US009298841B2

(12) United States Patent
Stuart

(10) Patent No.: US 9,298,841 B2
(45) Date of Patent: Mar. 29, 2016

(54) METHOD AND SYSTEM FOR ADDING COMBINATION FIELDS TO SHAREPOINT (TM)

(75) Inventor: Andrew Stuart, Jenkintown, PA (US)

(73) Assignee: IMS HEALTH INCORPORATED, Danbury, CT (US)

( * ) Notice: Subject to any disclaimer, the term of this patent is extended or adjusted under 35 U.S.C. 154(b) by 289 days.

(21) Appl. No.: 12/952,296

(22) Filed: Nov. 23, 2010

(65) Prior Publication Data

US 2011/0126088 A1 May 26, 2011

Related U.S. Application Data

(60) Provisional application No. 61/263,514, filed on Nov. 23, 2009.

(51) Int. Cl.
*G06F 17/00* (2006.01)
*G06F 17/30* (2006.01)
*G06F 9/445* (2006.01)
*G06F 17/22* (2006.01)

(52) U.S. Cl.
CPC ...... *G06F 17/30893* (2013.01); *G06F 9/44521* (2013.01); *G06F 17/2235* (2013.01); *G06F 17/30014* (2013.01)

(58) Field of Classification Search
CPC .......... G06F 17/30893; G06F 17/2235; G06F 17/30014; G06F 9/44521
USPC ............................. 715/206; 709/204; 717/162
See application file for complete search history.

(56) References Cited

U.S. PATENT DOCUMENTS

| | | | |
|---|---|---|---|
| 7,672,995 B2* | 3/2010 | Balasubramanyan et al. | 715/239 |
| 2006/0070020 A1* | 3/2006 | Puttaswamy et al. | 717/101 |
| 2006/0123010 A1* | 6/2006 | Landry | G06F 17/30557 |
| 2007/0061706 A1* | 3/2007 | Cupala | G06F 9/4433 715/210 |
| 2007/0100834 A1* | 5/2007 | Landry et al. | 707/10 |
| 2007/0174331 A1* | 7/2007 | Wolf et al. | 707/102 |
| 2007/0244867 A1* | 10/2007 | Malandain | G06F 17/30616 |
| 2009/0006953 A1* | 1/2009 | Perantatos et al. | 715/700 |
| 2009/0254422 A1* | 10/2009 | Jenkins et al. | 705/11 |
| 2010/0250609 A1* | 9/2010 | Campbell | G06Q 10/087 707/795 |

OTHER PUBLICATIONS

Pay Cherny, "Extend SharePoint to Integrate Other Office Applications: Inside SharePoint—Integrating Office Application", Jul. 2008, Tech Net Magazine, pp. 1-8.*
Waldek Mastykarz, "Extending Lookup Fields with "Add new item" option", Oct. 3, 2009, Office Servers and Services MVP, pp. 1-12.*
"In Rule's Sharepoint Technologies Improved and Extended", Sep. 15, 2009, InRule Technologies, pp. 1-6.*

* cited by examiner

*Primary Examiner* — Chau Nguyen
(74) *Attorney, Agent, or Firm* — Maldjian Law Group LLC

(57) ABSTRACT

Provided is a system, computer-readable medium controller, and methods for operating Microsoft Windows SHAREPOINT Services and its supportive operating system, network interface and related software and extending the SHAREPOINT Services to comprise combination fields.

18 Claims, 4 Drawing Sheets

METHOD AND SYSTEM FOR ADDING COMBINATION FIELDS TO SHAREPOINT (TM)

CROSS REFERENCE TO RELATED APPLICATIONS

This application claims priority from U.S. Provisional Patent Application No. 61/263,514 filed on Nov. 23, 2009, by Andrew Stuart titled "METHOD AND SYSTEM FOR ADDING COMBINATION FIELDS TO SHAREPOINT™," which is incorporated herein by reference in its entirety.

FIELD OF THE INVENTION

This invention generally relates to the Microsoft SHAREPOINT™ platform, and more particularly, to extending standard Microsoft SHAREPOINT™ technology with "combination fields" that enable entities deploying SHAREPOINT™ to leverage the platform not only for data storage, capture and processing, but as a true platform for enterprise applications that require multiple sets of linked data

BACKGROUND OF THE INVENTION

Microsoft SHAREPOINT™ is a family of software products developed by Microsoft Corporation for collaboration, file sharing and web publishing. The Microsoft SHAREPOINT Server is one of these products.

As depicted in FIG. 1, a Microsoft SHAREPOINT™ Server (hereinafter, "Server") is generally composed of three major tiers or logical layers: 1.) a Web Front End layer 102 which processes HTTP requests to the Server; 2.) An application layer 104 which provides such features as Search and Excel Services; and, 3.) A dedicated Microsoft SQL Server data storage 106.

While SHAREPOINT™ users can access SHAREPOINT™ functionality through multiple methods, the primary user interface is a web-based application accessed through a browser. The majority of SHAREPOINT™'s functionality is supported across all major desktop web browsers.

SHAREPOINT™ can also be accessed through: a Windows-based synchronized desktop client, Windows 7 Federated Search, WebDAV "Internet folders" (i.e. via Windows Explorer), Microsoft Outlook, Microsoft Office 2010, and other third party applications. Corporate directory security restrictions may be applied at a granular level, enabling SHAREPOINT™ sites to be internet-facing, intranet-facing, or both.

SHAREPOINT™ sites are, functionally, ASP.NET 2.0 web applications that are served using IIS and a SQL Server database as a data storage back end, or equivalents thereof. All site content data, such as items in document libraries and lists, are stored within an SQL database named by default as "WSS_Content_[ID]".

Standard SHAREPOINT™ functionality is extremely flexible in that it allows system developers to rapidly deploy applications that can capture a variety of data with specific fields and then store that data in various buckets for further processing with workflows. See, for example, SHAREPOINT™ 'Content Types', 'Fields' and 'Lists'. Often, system developers like to use simplified data structures and eliminate unnecessary redundancy. However, a serious limitation in SHAREPOINT™ makes it extremely difficult to produce complex data structures whereby one data item contains within a single data field multiple sets of reference data items.

SUMMARY OF THE INVENTION

An aspect of the present invention provides an application development system, including a computer processor and associated computer memory. The processor is in operative communication with standard input and output devices, a computer network, and a data storage device. The memory includes computer instructions and data which, when accessed by the processor, configure the processor to perform several steps. These include the steps of operating Microsoft Windows SHAREPOINT Services and its supportive operating system, network interface and related software, and extending the SHAREPOINT Services to comprise combination fields.

Another aspect of the invention provides for allowing a user to extend the SHAREPOINT services by providing a combination field form to a user on a display output device and further to allow the user to select the fields to combine for extending the SHAREPOINT services from the combination field form.

Another aspect of the invention provides for allowing a user to specify a field within any type of content that directly allows the creation, storage and linking of multiple items of any single type of content that is stored within a specific list.

In another aspect, the invention provides for allowing the user to create new content elsewhere in the system from a combination field form and automatically be have that content associated with an item from which it was created.

Another aspect of the invention provides for allowing the user to directly utilize one or more field controls from a 'Content Type' specified by the settings of an underlying 'Combination Field' to directly render the fields of a referenced 'Content Type'.

A further aspect of the invention provides for displaying information from remotely created content directly within an item from which it was created and allowing multiple remote records to be referenced from within the combination field form.

Another aspect of the invention provides for 7. setting permissions automatically on content that was linked to, using information about the user, and allowing the user to navigate between items using links as they are, in turn, rendered as hyperlinks when displayed for rapid navigation through lists in the system.

Additional aspects of the invention include computer-readable media containing computer code and data for configuring a computer processor to operate the methods and aspects described herein.

DETAILED DESCRIPTION

In the following description, for purposes of explanation, specific numbers, materials and configurations are set forth in order to provide a thorough understanding of the invention. It will be apparent, however, to one having ordinary skill in the art, that the invention may be practiced without these specific details. In some instances, well-known features may be omitted or simplified so as not to obscure the present invention. Furthermore, reference in the specification to "one embodiment" or "an embodiment" means that a particular feature, structure or characteristic described in connection with the embodiment is included in at least one embodiment of the invention. The appearances of the phrase "in an embodiment" in various places in the specification are not necessarily all referring to the same embodiment.

The present invention utilizes a computer system having a minimal configuration of at least one processor and associated computer memory, the processor and memory configured to operate as a Microsoft SHAREPOINT™ Server providing Microsoft SHAREPOINT™ Services, in addition to the method and data structures as described herein. Reference herein to "Microsoft SHAREPOINT™ Services" or simply "SHAREPOINT" assumes the use of a Microsoft SHAREPOINT™ Server. The computer memory is configured with processor instructions and data which, when loaded into the processor, cause the processor to execute the methods of the invention.

The Microsoft SHAREPOINT™ Server computer system may alternatively be comprised of several processors with associated computer memory, as is well understood in the art.

An embodiment of the present invention advantageously provides for producing complex data structure items in a Microsoft SHAREPOINT™ platform application, whereby one data item contains within a single data field multiple sets of reference data.

Figure 1:
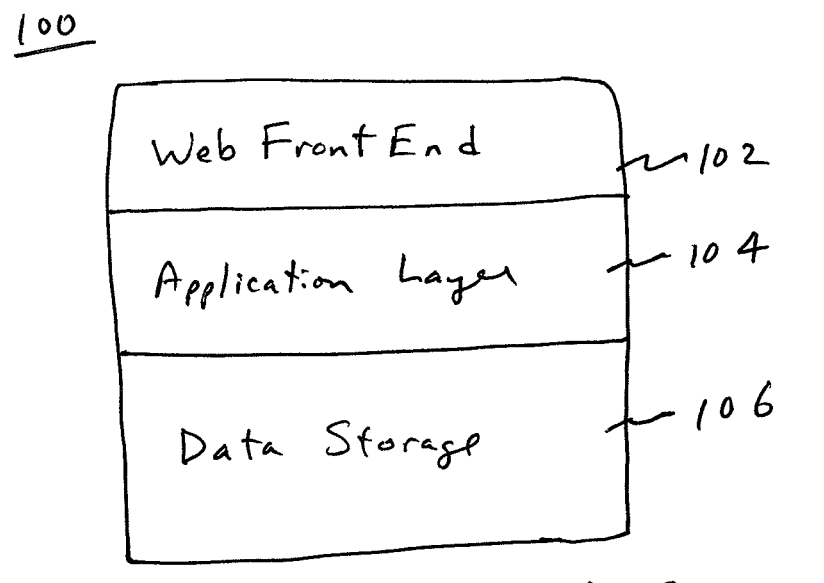
FIG. 1 is a block diagram depicting the organization of memory layers in a typical prior art Microsoft SHAREPOINT™ Server.

FIG. 1 depicts a simplified exemplary memory schematic 100 of the software layers for a prior art Microsoft SHAREPOINT™ Server. A typical Microsoft SHAREPOINT™ Server includes a web front end 102, an application layer 104, and data storage 106.

The web front end 102 layer processes HTTP requests to the Microsoft SHAREPOINT™ Server.

The data storage 106 layer provides a data repository.

The application layer 104 is where SHAREPOINT™ applications reside.

Figure 2:
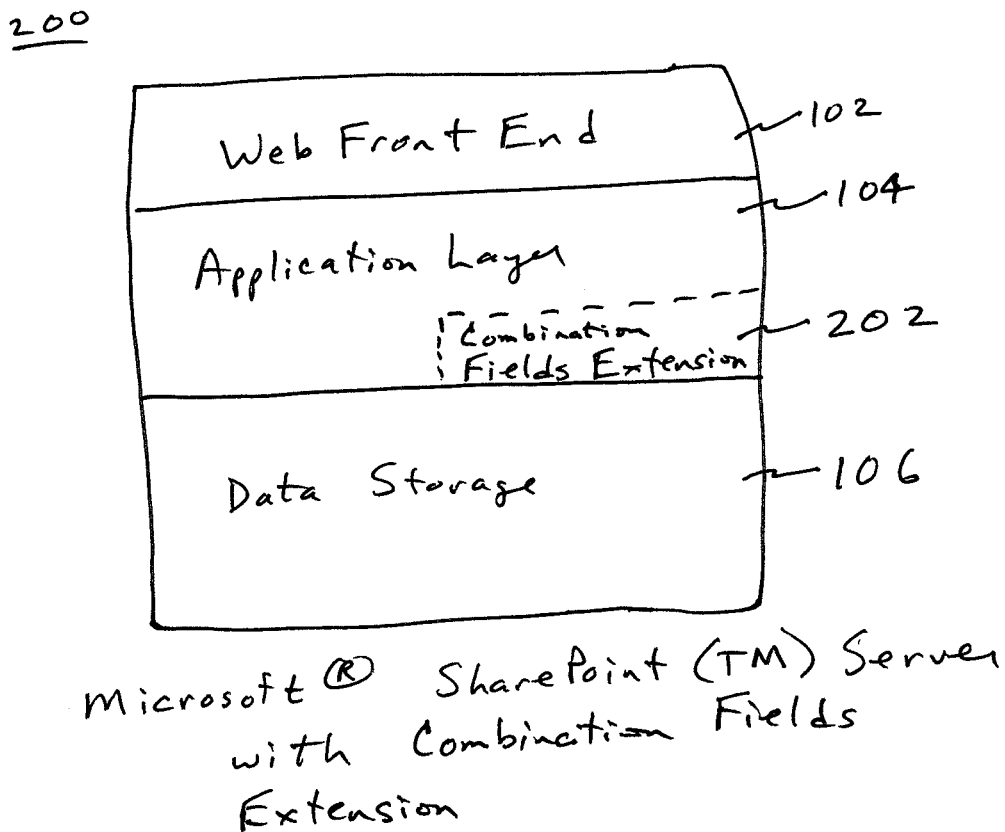
FIG. 2 is a block diagram depicting the organization of memory layers in a Microsoft SHAREPOINT™ Server with the combination fields extensions, in accordance with an embodiment of the present invention.

FIG. 2 depicts a simplified exemplary memory schematic 200 of the software layers in an embodiment of the invention. The web front end 102 and data storage 106 layers operate as in FIG. 1. However, the application layer 104 includes the necessary support for the inventive combination fields extension 202.

Figure 3:
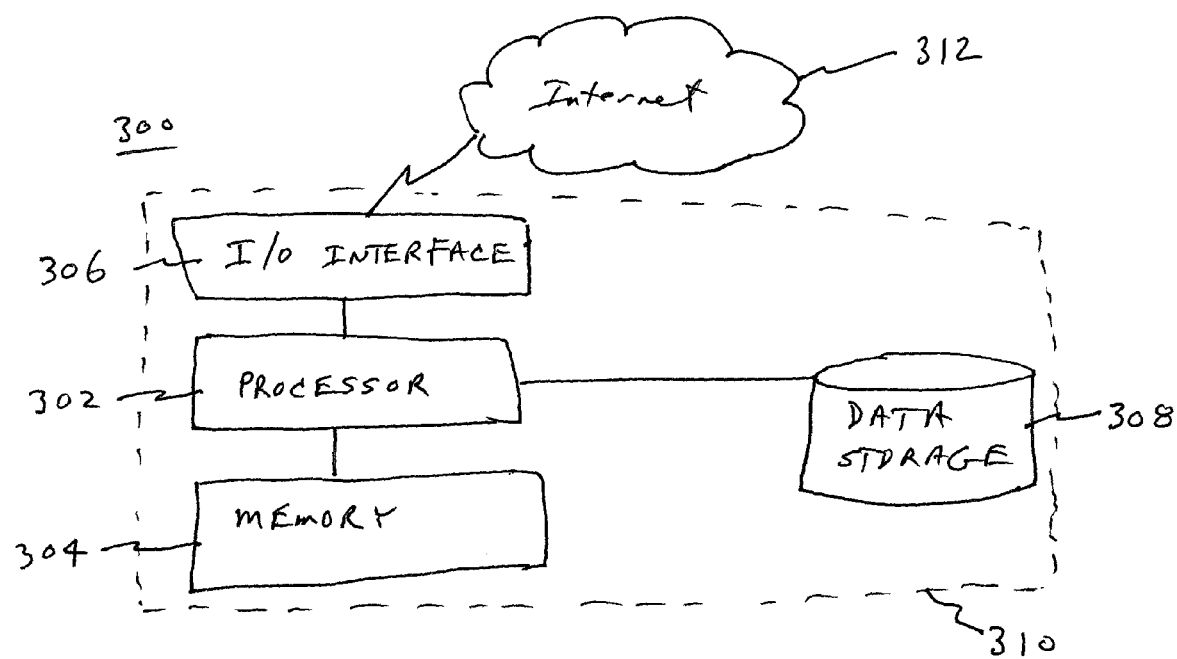
FIG. 3 is a block diagram depicting a typical system configuration in accordance with an embodiment of the present invention.

FIG. 3 is a block diagram depicting exemplary components of a system 300 employing the present invention. A SHAREPOINT™ Server 310 is provided, including a computer processor 302, associated computer memory 304, input/output interface 306, and data storage 308. In an embodiment of the invention, the server 310 is in communication with a network such as the Internet 312 via the I/O interface 306, although alternatives to the Internet are envisioned, and even a stand-alone system may alternatively be deployed.

Several application development systems have been built using Microsoft SHAREPOINT™ as a basis. On such system, R-Squared's *Rapid Application Development System: RADS®* (hereinafter "RADS®"), represents a preferred embodiment of the present invention. See, "R-Squared Services & Solutions: RADS® Platform and Architecture", available at http://www.r2ss.com/Documents/RADS%20Architecture.pdf for additional information about RADS®.

Figure 4:
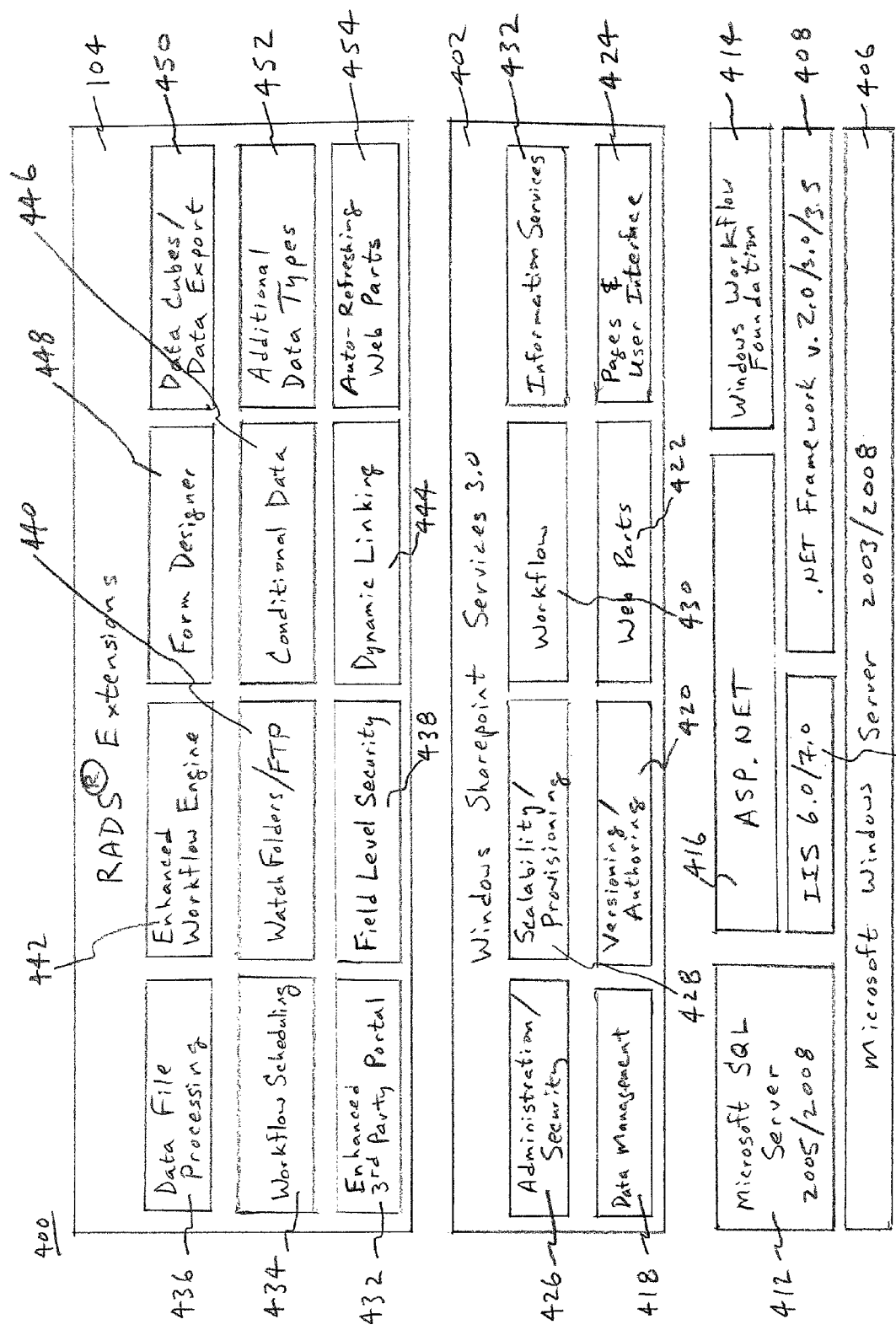
FIG. 4 is a block diagram depicting memory organization in a preferred embodiment of the present invention.

FIG. 4 depicts a simplified memory map of RADS®. Several system software components are depicted, such as Microsoft Windows Server 2003/2008 406, Microsoft SQL Server 2005/2008 412, IIS 6.0/7.0 410, .NET Framework v2.0/3.0/3.5 408, ASP.NET 416, and Windows Workflow Foundation 414. It is understood by those of skill in the art that substitution of any one or more of these components by equivalent other components or future versions of the listed components is envisioned and expected, and would be consistent with the spirit and scope of the present invention.

Also depicted are various Windows SHAREPOINT Services 402, including Data Management 418, Versioning/Auditing 420, Web Parts 422, Pages & User Interface 424, Administration/Security 426, Scalability/Provisioning 428 and Information Services 432.

Also depicted in FIG. 4 are RADS Extensions 104—which takes the place in the Application Layer 104 of FIGS. 1 and 2. These have been added to the Windows SHAREPOINT Server in the RADS® system. They include, but are not limited to, modules for handling: Data File Processing 436, Enhanced Workflow Engine 442, Form Designer 448, Data Cubes/Data Export 450, Workflow Scheduling 434, Watch Folders/FTP 440, Conditional Data 446, Enhanced $3^{rd}$ Party Portal 432, Field Level Security 438, Dynamic Linking 444, Auto-Refreshing Web Part 454, and Additional Data Types 452. The combination fields of the present invention are primarily provided within the RADS® Additional Data Types 452 module, although other modules and components are relied upon for support of various features of the combination fields.

The combination field as presented herein extends Microsoft SHAREPOINT™ with the following critical capabilities:

Allow users to specify a field within any type of content that directly allows the creation, storage and linking multiple items of any single type of content that is stored within a specific list elsewhere in the system on the fly;

Create new content elsewhere in the system from a form displayed within the combination field and automatically be have that content referenced back to the item from which it was created;

Directly utilize the field controls from the 'Content Type' specified by the settings of the underlying 'combination field' to directly render the fields of the referenced 'Content Type' without any requirement for customization of the 'combination field';

Display information from the remotely created content directly within the item from which it was created and to allow multiple remote records to be referenced from within the combination field;

Set permissions automatically on the content that was linked to, using information about the user performing the linking; and Navigate between items using the links as they are, in turn, rendered as hyperlinks when displayed for rapid navigation through lists in the system.

In addition, within RADS®, system administrators can define restrictions on the combination field, such as, but not limited to:

Allow linking only to a certain SHAREPOINT 'Content Types' within a specific 'List';

Specify the fields available for edit and or view on the remote 'Content Type';

Set permissions on items that are created from the combination field; and

Have the referenced item 'Deleted' or 'Modified' as actions are performed within the 'combination field'.

There are presently no Microsoft SHAREPOINT™ capabilities to allow data to be created elsewhere in the system from a field on a 'Content Type'. The closest capability to this requires the use of a 'Form Server' or custom web pages each with custom processing on a per form basis required to populate data in multiple locations, the limitation with this mechanism is that is requires separate coding for every form/destination type combination and does not support the underlying field controls for the referenced content type, but rather requires that every field would have to have a specifically coded form capability if such a capability could even be achieved.

Presently, Microsoft SHAREPOINT™ provides a 'Link' capability primarily using the 'Lookup' field type. This field type allows an administrator to specify for a given SHAREPOINT™ field a 'List' and display field to which users will be able to make a selection. This 'Link' capability is limited in several ways, including:

1. It will display all items to which the users have access in the list, regardless as to the underlying content type of the item;
2. The items displayed are returned from a single list;
3. The item that is being referenced must exist prior to selection;
4. The item that is being linked to has no way of referencing back to the item from which it was linked; and
5. The mechanism for linking is a 'Drop Down List Box' from which the user will select an item, if there a many hundreds of items the user must scroll through the entire list of items.

With the RADS®, several extensions to the SHAREPOINT™ capabilities have been developed, such as allowing lookups to have 'Queries' that can restrict the type and number of items returned. For example, a new field type was added called 'RADS: Lookup'. This was somewhat of an obvious extension as it extends the existing capabilities without having to redefine the way in which the underlying field control functions, e.g., it still presents as a 'Drop Down List Box' and the system administrator on the field definition may simply specify some addition criteria to limit the entries that are being returned.

With standard SHAREPOINT™, tables are replaced with 'Lists' and the types of data with 'Content Types'. However, as nothing needs to be defined ahead of time in SHAREPOINT™, there is no obvious way for laying out the references that will exist between all the items. In RADS®, the mechanism used to overcome this problem get is by leveraging the historical way in which applications are defined. This mechanism has historically been chosen by most other developers of SHAREPOINT™ applications. A basic data model is first created that includes a few key 'Content Types' and 'Lists' where references between the 'Content Types' in various 'Lists' are defined ahead of time using field such a 'Lookup' that create a basic link between items and which allows on-the-fly development to take advantage of the existing basic 'Content Types' and/or 'Lists'.

In a preferred embodiment of the invention, the inventive method approaches this differently in that it is determined that if the 'Content Types' and 'Lists' are not defined ahead of time, why not allow 'Items' to also be created on the fly directly from fields within the field capable of natively displaying the field controls for the underlying referenced 'Content Type'. In implementation, this mechanism for creating a referenced 'Content Type' from within a custom field control that represents its own embedded form context for 'Combination Field' was employed.

In an embodiment of the present invention, the combination field employs the following inventive features:

1. Use of a form context embedded directly within a field control to allow users to directly create items that are stored elsewhere within SHAREPOINT™. This includes the
   a. Support for RADS® extensions on fields to allow conditional visibility of fields, data communication between fields, custom data validation and security;
   b. Ability to insert new entries to create new records and references to items created elsewhere within the system; and
   c. Capability to modify or delete entries that have previously been created by the specific instance of a combination field.
2. Allow system administrators to define fields and layout of the referenced content type, such as,
   a. Specifying the fields that will be available for edit when creating the underlying content type.
   b. Specifying the fields that will be displayed within the combination field when an item is created.
   c. Specifying the order in which fields will be displayed on the form.
3. Allow system administrators to define permissions on whether new items can be created and the permissions on the items that will be created.
4. Send data to items that are referenced to allow them to link back to the item from which they are being referenced.

In an exemplary implementation of the combination field, a base class is first created that inherits from standard SHAREPOINT™ classes for defining custom fields. This base class has a custom field definition control in addition to the field control. Microsoft SHAREPOINT™ Custom Properties capability is used to create additional properties on the Field type, using a meta-schema (e.g. XML) and both the standard properties that are used by RADS® as well as specific custom fields used by the combination field field type are defined.

Next, information about how the fields should behave in RADS® forms (using the standard RADS® properties) and information about the combination field is stored. The 'Standard RADS® Properties' include information about dependent fields, visibility constraints, permissions on viewing the data amongst other information. In an embodiment of the present invention, the combination field properties' (used in the definition for a combination field field) are shown below.

TABLE 1

| Property | Description |
| --- | --- |
| Number of inserts | This controls how many items can be remotely created and stored within the field at one time, e.g. if set to 1 it allows only a single reference, if set to 0 it allows unlimited references to other items. |

TABLE 1-continued

| Property | Description |
| --- | --- |
| From Parent | Whether new items should be created in a folder that has the same name as the parent item. This allows permissions to be specified on the folder level and for users to create new items that in effect mimic the folder structure of the referencing item (parent). |
| Specify List and Folder | Whether the user is able to specify the list and/or folder in which items will be created. |
| Form Display Mode | Whether a blank form should be display immediately upon the user accessing the field and whether after an entry is created a blank form is re-displayed. |
| Show Field Titles | Whether the 'Title' or name of the underlying field is displayed in the left hand column of the form. |
| Content Type & List | The 'Content Type' for items and the 'List' in which the items will be created. |
| Cascade Delete | Whether items that are created from this field will be removed from the underlying list when deleted from this referencing Combination Field. |
| Fields for 'Edit', 'Display' and field order | What fields should be displayed and the order in which they should be displayed in the form that is used for creating the referenced content type. |
| Set Permissions | See 'Permissions'. |

Also in an embodiment of the invention, permissions properties on a combination field definition may be used to determine the permissions to any items that are created from the Combination Field. The SHAREPOINT API is used to query the permissions levels, groups and users in the system, these options can be selected in combination to define the permissions that will be set onto an item that is created through the combination field field. The permissions for the user creating the item at the time can also be set.

For example, <Site Owners>-> Full Control, <Current User>-> Contributor, <Site Members-> Read would remove all permissions on the item created and assign all members of the <Site Owners> user group Full Control on the item, the <Current User> would have Contributor permission and <Site Members> permissions to Read the item.

The permissions can override any inheritable permissions on the item.

Regarding the Combination Field Control—this field functions in conjunction with the inventive Dynamic Form, which extends the SHAREPOINT™ forms to also include support for AJAX and standard RADS® properties to control visibility and transmittal of fields values between fields. These extensions provide a framework in which the Combination Field Control can independently perform post-backs and communicate with the server without requiring full post-backs of the entire form, this gives the combination field the appearance of operating dynamically within the browser, and in a form not enabled form this dynamic support the combination field requires post-back events of the entire form. The combination field interprets the field definition information to function appropriately, it renders within a structure that separates overall control functions from the referencing functions. (e.g. HTML Table Control).

In an embodiment of the present invention, overall control functions include Insert (or Add), Save, Save Changes, Modify, Delete and Cancel. The Insert function allows a new blank form to appear as part of the field control, Save will save the information presented in the form and will create an item of the specified content type in the underlying list, Cancel will cancel the current operation (and close the current form), Save Changes will allow users to save change made to an existing entry, Modify will present a form pre-populated with data from the item that was selected for modification and Delete will remove the item from the current field.

In order to facilitate the creation of items that match the field definition, the Field Control uses the SHAREPOINT™ API to perform queries and other functions to create entries. Between each step, a post-back mechanism may be used to transmit the user action from the client (browser) to the server. When an item is created against which a reference will be recorded in the field it is presented to the client with a hyperlink to allow direct navigation to the referenced item as well as control options to allow the user to modify and/or remove the reference (e.g. Modify and Delete).

The combination field, according to an embodiment of the present invention, uses SHAREPOINT™ MultiColumn Field Value—although other similar field value storage mechanisms could be used—to store information about references. The initial columns (header columns) within the MultiColumn Field Value store information about the number of references, version and the number of columns of data used per entry. This mechanism future proofs data stored within the Field Value as the number of columns per storage entry can then grow over time and backwards compatibility with older data can be maintained by simply reading the version information from the initial header columns. An indicator field within the header can be used to specify additional header type information. Per data row entry (i.e. per reference) information is then stored about the item being referenced. This information includes about the item including its GUID, ID, Version Number, ListGUID (for the list from which it was referenced), List Name, Content Type Name and Content Type GUID, the Identifier for the user that made the reference and the date/time of the reference (other information can also be stored per data entry row).

The per data entry row information may then be used when rendering views of the references (e.g. Dynamic Rendering Text and/or Hyperlinks to allow view and/or edit of the referenced item). It also allows the field definition to be changed over time without impacting past references as all the information required to resolve a reference is permanently stored. If a data entry row is permanently deleted then all information for the data entry row is removed.

Also in an embodiment of the invention, bi-directional references are maintained by the destination utilizing RADS® Receiver combination field. An exemplary RADS® Receiver combination field operates simply by being able to store a read-only reference to a single item based on information stored as part of the field data when the item is created. When a new item is created from a combination field, additional information about the item, including its identifiers and list, is passed to the Receiver combination to hold a permanent reference back to the originating item from which it was created.

Also in an embodiment of the invention, when references to an item removed within a combination field the 'On Save' Event provides the mechanism to remove the reference from the previously referred to item, if it is appropriately configured with a Receiver combination field.

A partial listing of source code used in an exemplary embodiment of the invention was attached to the related provisional application and is included herein by reference. It is understood and envisioned that the present invention can be practiced with alternative enabling code and variations from this sample code, without departing from the spirit and scope of the present invention.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. An application development system comprising:
a computer processor and associated computer memory, the computer processor in continuous operative communication with standard input and output devices, a computer network, and a data storage device;
the computer memory comprising computer instructions and data which, when accessed by the computer processor, configure the computer processor to perform the steps of:
operating a server-based application platform and its supportive operating system, network interface and related software;
extending the server-based application platform to comprise at least one combination field by
creating a base class that includes a custom field definition control used to create custom properties on a combination field type, and
storing information, using the custom field definition control, about the combination field that includes information about at least one of dependent fields, visibility constraints, and permissions on viewing data; and
maintaining bi-directional references between an item and an originating item from which the item is created using the combination field;
wherein the combination fields provide a user-specified and defined field within any type of content allowing real-time creation, storage and linking, based upon information received from a user creating the combination fields, of multiple items of a single type of content that are stored within a list on the computer memory, thereby allowing multiple remote records to be referenced by a single combination field, and providing linking capabilities for items in the list regardless of content type of the items.

2. The application development system according to claim 1, wherein the computer processor is further configured to allow a user to extend the server-based application platform by providing a combination field form to the user on a display output device and further to allow the user to select the combination fields to combine for extending the server-based application platform from the combination field form.

3. The application development system according to claim 2, wherein the computer processor is further configured to allow the user to create new content elsewhere in the application development system from the combination field form and automatically have that content associated with an item from which it was created.

4. The application development system according to claim 2, wherein the computer processor is further configured to allow the user to directly utilize one or more field controls from a 'Content Type' specified by the settings of an underlying 'Combination Field' to directly render the fields of a referenced 'Content Type'.

5. The application development system according to claim 2, wherein the computer processor is further configured to display information from remotely created content directly within an item from which it was created and to allow multiple remote records to be referenced from within the combination field form.

6. The application development system according to claim 2, wherein the computer processor is further configured to set permissions automatically on content that was linked to, using information about the user that is defining the combination fields.

7. The application development system according to claim 2, wherein the computer processor is further configured to allow the user to navigate between items using links as they are, in turn, rendered as hyperlinks when displayed for rapid navigation through lists in the system.

8. The application development system according to claim 1, wherein the combination fields allow a user to specify a field within any type of content that directly allows the creation, storage and linking of multiple items of any single type of content that is stored within a specific list.

9. The application development system according to claim 1, wherein the server-based application platform comprises Microsoft Windows SHAREPOINT.

10. A method for extending a server-based application platform for a user to develop applications, the method comprising:
operating a server-based application platform and its supportive operating system, network interface and related software on a computer processor and associated computer memory configured to perform the method, the computer processor in continuous operative communication with standard input and output devices, a computer network, and a data storage device and the computer memory;
extending the server-based application platform to comprise combination fields by
creating a base class that includes a custom field definition control used to create custom properties on a combination field type, and
storing information, using the custom field definition control, about the combination field that includes information about at least one of dependent fields, visibility constraints, and permissions on viewing data; and
maintaining bi-directional references between an item and an originating item from which the item is created using the combination field;
wherein the combination fields provide a user-specified and defined field within any type of content allowing real-time creation, storage and linking, based upon information received from a user creating the combination fields, of multiple items of a single type of content that are stored within a list on the computer memory, thereby allowing multiple remote records to be referenced by a single combination field, and providing linking capabilities for items in the list regardless of content type of the items.

11. The method according to claim 10, further comprising:
allowing a user to extend the server-based application platform by providing a combination field form to the user on a display output device; and
allowing the user to select the fields to combine for extending the server-based application platform from the combination field form.

12. The method according to claim 11, further comprising allowing the user to create new content elsewhere in an application development system from the combination field form and automatically be have that content associated with an item from which it was created.

13. The method according to claim 11, further comprising allowing the user to directly utilize one or more field controls from a 'Content Type' specified by the settings of an underlying 'Combination Field' to directly render the fields of a referenced 'Content Type'.

14. The method according to claim 11, further comprising displaying information from remotely created content directly within an item from which it was created and allowing multiple remote records to be referenced from within the combination field form.

15. The method according to claim 11, further comprising setting permissions automatically.

16. The method according to claim 11, further comprising allowing the user to navigate between items using links as they are, in turn, rendered as hyperlinks when displayed for rapid navigation through lists in the system.

17. The method according to claim 10, further comprising allowing a user to specify a field within any type of content that directly allows the creation, storage and linking of multiple items of any single type of content that is stored within a specific list.

18. The method according to claim 10, wherein the server-based application platform comprises Microsoft Windows SHAREPOINT.

* * * * *